United States Patent [19]

Ishizuka

[11] Patent Number: 5,082,165
[45] Date of Patent: Jan. 21, 1992

[54] DEVICE FOR FORWARDING SEMICONDUCTOR LEAD FRAMES AND METHOD OF OPERATING THE SAME

[75] Inventor: Masahiro Ishizuka, Fukuoka, Japan

[73] Assignee: Mitsubishi Denki Kabushiki Kaisha, Japan

[21] Appl. No.: 504,008

[22] Filed: Apr. 4, 1990

[30] Foreign Application Priority Data

Jul. 28, 1989 [JP] Japan .................................. 1-194002

[51] Int. Cl.⁵ ........................................... H01L 21/58
[52] U.S. Cl. ..................................... 228/179; 228/6.2
[58] Field of Search ................... 228/4.5, 6.2, 47, 179, 228/180.2; 226/162, 165, 166, 167

[56] References Cited

U.S. PATENT DOCUMENTS 3,698,620  10/1972  Geyer et al. ......................... 228/6.2
4,558,809  12/1985  Schoen .................................. 226/162
4,763,827   8/1988  Watanabe et al. .............. 228/6.2 X

FOREIGN PATENT DOCUMENTS

63-56121  11/1988  Japan .
63-56122  11/1988  Japan .
63-57329  11/1988  Japan .

Primary Examiner—Kenneth J. Ramsey
Attorney, Agent, or Firm—Leydig, Voit & Mayer

[57] ABSTRACT

A device for forwarding semiconductor lead frames to a heater unit having a fixed heater surface. The lead frame is clamped and lifted by a predetermined height by a pair of clamp lifters and forwarded by linear motion guides on which the clamp lifters are mounted. Each clamp lifter includes upper and lower jaws, a cam mechanism including a vertically sliding horizontal rail, a lower jaw holder vertically slidably mounted on a linear motion guide, a support block vertically slidably mounted on the linear motion guide, and an upper jaw holder rotatably mounted to the support block. The cam mechanism varies the height of the sliding rail to three distinct levels, and thus effects the clamping and lifting operations of the clamp lifter.

14 Claims, 7 Drawing Sheets

DEVICE FOR FORWARDING SEMICONDUCTOR LEAD FRAMES AND METHOD OF OPERATING THE SAME

BACKGROUND OF THE INVENTION

This invention relates to devices for forwarding lead frames carrying a plurality of semiconductor pellets thereon to and from a work station at which die bonding operations, etc., are performed on the semiconductor pellets carried on the lead frames; this invention also relates to methods of operating such forwarding devices.

Figure 1:
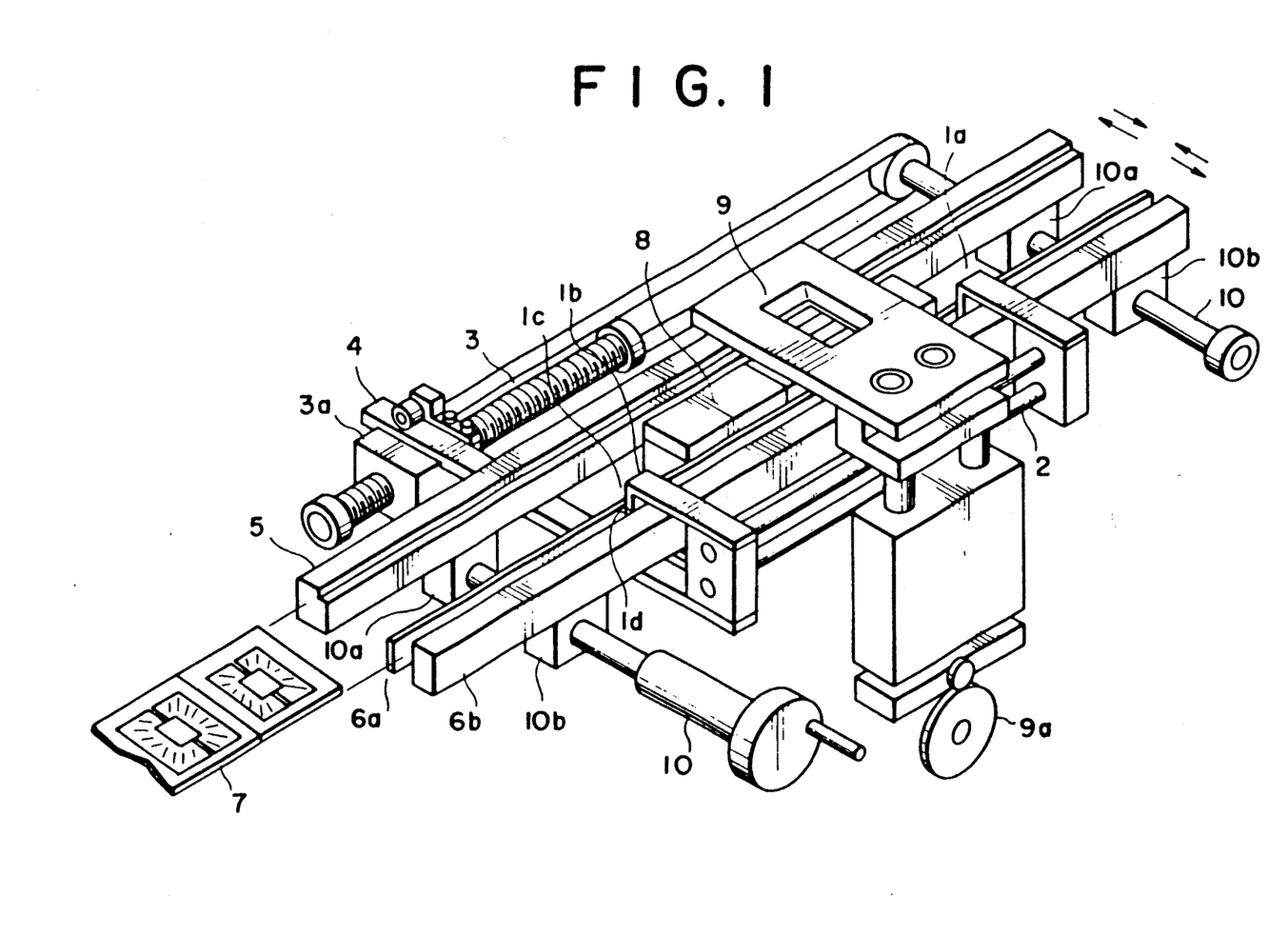
FIG. 1 is a perspective view of a conventional device for forwarding semiconductor lead frames.

FIG. 1 shows in a perspective view of a conventional device for forwarding semiconductor lead frames.

Each of a pair of clamp units 1a and 1b for clamping the lead frame 7 at a side thereof, comprises an upper and a lower jaw 1c and 1d. The two units 1a and 1b are of identical structure and are connected to each other via connector rods 2. On a ball thread 3 is threaded a nut 3a to which a transmission plate 4 coupled to the clamp unit 1b is mounted. Thus, the translation of the nut 3a effected by means of the ball thread 3 is transmitted via the transmission plate 4 to the clamp units 1b and 1a. The device further comprises a rail 5 having sliding surfaces for supporting the side and the bottom surfaces of the lead frame 7 and rails 6a and 6b which are partitioned into two parts for translating the clamp units 1a and 1b in the forwarding direction of the lead frame, wherein the rail 6a is a bottom guide rail whose upper surface forms the sliding surface for the bottom surface of the lead frame 7, and the rail 6b is the side guide rail, a portion of whose surface opposing the rail 5 forms a sliding surface for a side surface of the lead frame 7. As is well known, the lead frame 7 carries a plurality of semiconductor pellets thereon at a predetermined pitch.

A heater device 8 for heating the lead frame 7, consisting for example, of a heat block, is vertically translatable and supported by a cam (not shown). Further, a lead frame presser 9, positioned above the heat block 8, is vertically translatable and supported by a cam 9a, for example, for pressing a lead frame 7 forwarded by the clamp units 1a and 1b against the upper surface of the heat block 8.

Furthermore, a threaded shaft 10 for width adjustment comprises left- and right-handed threads engaging nuts 10a and 10b of right- and left-handed threads, respectively, which are mounted to the rail 5 and the bottom and the side guide rails 6a and 6b.

The operation of the conventional device for forwarding the semiconductor lead frames is as follows.

The lead frame 7 is accommodated in a forwarding means (not shown) distinct from that shown in the figure, e.g., a magazine for lead frames, and is inserted by a pusher, for example, into the forwarding device of FIG. 1 by a predetermined length. Upon insertion, the lead frame 7 is guided by the rail 5 and the bottom and side guide rails 6a and 6b.

Next, the ball thread 3 is driven by a driving device (not shown), and the clamp unit 1b is returned, with the upper and lower jaws kept open, to the position spaced by a predetermined length to the left in the figure from the front end of the inserted lead frame 7. Thereafter, the upper and lower jaws of the clamp unit 1d are closed to clamp the lead frame 7 therebetween at one side of the lead frame. Further, the clamp unit 1b, which keeps on clamping the lead frame 7, is translated toward the right in the figure by a predetermined length, e.g., a length equal to the pitch of the lead frame 7. Next, the clamp unit 1b is opened, and the ball thread is rotated in the reverse direction to return the clamp unit 1b to the original position at which the lead frame 7 was clamped. This sequence completes one forwarding operation cycle.

Thus, by means of one forwarding operation cycle of the clamp unit 1b, the lead frame 7 is forwarded by a predetermined length, e.g., by a length equal to the pitch of the lead frame 7. In like manner, the forwarding operation cycles are repeated, thereby forwarding successively the lead frame 7 to the predetermined position of the heat block 8.

When the lead frame 7 is forwarded to the heat block 8, the lead frame presser 9 is in an upward released position. In addition, the heat block 8 is in a downward position. Next, the cams operating the heat block 8 and the pressure 9 are driven so that the heat block 8 is raised and the presser 9 is lowered. Thus, the lead frame 7 fed by the clamp unit 1b is pressed on the upper surface of the heat block 8 by the presser 9. The heat block 8 is at the position at which the work station is situated on which the well-known operations such as die bonding or wire bonding are effected.

The lead frame 7 which has undergone operations on the heat block 8 is forwarded out of the device by the clamp unit 1a which effects the forwarding operation by repeating similar cycles.

The conventional forwarding device, however, has the following disadvantage. When the lead frame 7 is forwarded over the heat block 8, the heat block 8 should be translated downward to make way for the lead frame 7 and not to interfere with the translation of the lead frame 7 thereover. However, generally, the heat block 8 must be heated to about 300° C., and the mechanism for the vertical translation thereof is affected by the heat transmitted therefrom. As a result, the vertical translation mechanism is prone to failures. This results in the failure in the pressing of the lead frame, and hence, defective products are produced in the wire boding or die bonding operations.

SUMMARY OF THE INVENTION

It is therefore a primary object of this invention to provide a device and a method for forwarding semiconductor lead frames wherein the lead frames can be forwarded without lowering the heater means.

The above object is accomplished according to the invention by a forwarding device for semiconductor lead frames which comprises a clamp lifter and a translator. The clamp lifter, disposed at a forwarding path of the lead frames, clamps the lead frame and lifts the clamped lead frame by a predetermined height. The translator translates the clamp lifter forward and backward along the forwarding path of the lead frame in a longitudinal direction of the lead frame.

It is preferred that the device according to this invention further comprises a heater means and a bottom guide rail means. The heater means heats a portion of the lead frame forwarded thereto, being disposed on a portion of the forwarding path of the lead frames near said clamp lifter and translator. The heater means includes a heater surface whose level is fixed. The bottom guide rail means extends along the forwarding path of the lead frames over a length spanning longitudinal positions of the clamp lifter and the heater for supporting a bottom surface of the forwarded lead frame. The clamp lifter clamps the lead frame supported on the bottom guide rail means, lifts the lead frame above the fixed level of the heater surface of the heater means by the predetermined height, and, after the clamp lifter is translated by said translator so that the clamped lead frame is forwarded by a predetermined length, lowers the lead frame to the level of the heater surface of the heater means.

The method of operating the device according to this invention comprises the following steps:

(a) clamping a lead frame supported on a bottom guide rail means and lifting it by a predetermined height by means of a clamp lifter above the level of the heater surface of the heater means;

(b) translating the clamp lifter forward by a predetermined length of the translator means, thereby forwarding the clamped and lifted lead frame along the forwarding path by the predetermined length;

(c) lowering the clamped lead frame to the level of the heater surface of the heater means, and a unfastening the clamp of the clamp lifter;

(d) returning the unfastened clamp lifter to a original position of the translator;

(e) performing an operation (such as die bonding and wire boding operations) on a semiconductor pellet carried on a portion on the lead frame positioned above the heater surface; and (f) repeating said steps (a) through (e).

The clamp lifter of the device according to this invention preferably includes upper and lower jaws between which the lead frame is to be clamped; a lower jaw holder supporting the lower jaw at an end thereof and vertically slidably supported by the translator which, may be a linear motion guide mechanism); a cam mechanism for varying a vertical level of the lower jaw holder to three distinct levels; a lowest, a middle and a highest level; a support block vertically slidably supported by the translator; an upper jaw holder supporting the upper jaw at an end of an arm thereof and rotatably supported by the support block for rotation in a jaw-closing direction and in a jaw-opening direction; leverage means, such as a bar, fixed to said lower jaw holder for abutting an end of an arm of the upper jaw holder opposite to the arm to the end of which the upper jaw is mounted, thereby turning said upper jaw holder in the jaw-opening direction to open the upper and lower jaws when the lower jar holder is brought from the middle to the lowest level by means of the cam mechanism; urging means (such as a spring) for urging the upper jaw holder in the jaw-closing direction, wherein the urging means urges and turns the upper jaw holder in the jaw-closing direction to clamp the lead frame between the two jaws when the lower jaw holder is raised from the lowest to the middle level by means of the cam mechanism; and engager means (such as an adjustable stopper fixed to the support block) for engaging the support block with the lower jaw holder during the time when the lower jaw holder is between the middle and the highest level so that when the lower jaw holder is raised by the cam mechanism from the middle to the highest level, the upper jaw holder is vertically translated upward together with the lower jaw holder with the upper and lower jaws maintained in a closed state, thereby lifting the lead frame clamped between the two jaws by the predetermined height.

The cam mechanism of the clamp lifter preferably includes a cam having a radius whose length has three distinct values; a sliding rail vertically slidably mounted to a support base of the device, the sliding rail having a roller rotatably mounted thereto which bears on the circumferential surface of the cam, so that the level of the upper surface of the sliding rail, in accordance with the rotational angle of the cam, is one of three distinct levels: the lowest, the middle, and the highest level; and a roller rotatably mounted to the lower jaw holder and rotating on the upper surface of the sliding rail so that the vertical level of the lower jaw holder, in accordance with the rotational angle is one of cam, to the three distinct levels: the lowest, the middle, and the highest level.

BRIEF DESCRIPTION OF THE DRAWINGS

The novel features of this invention are set forth with particularity in the appended claims. This invention itself, however, may best be understood by reference to the following detailed description of the preferred embodiment taken in connection with the accompanying drawings, in which:

In the drawings, like reference numerals represent like or corresponding parts or portions.

DESCRIPTION OF THE PREFERRED EMBODIMENT

Referring now to FIGS. 2 through 7 of the drawings, an embodiment of this invention is described.

Figure 2:
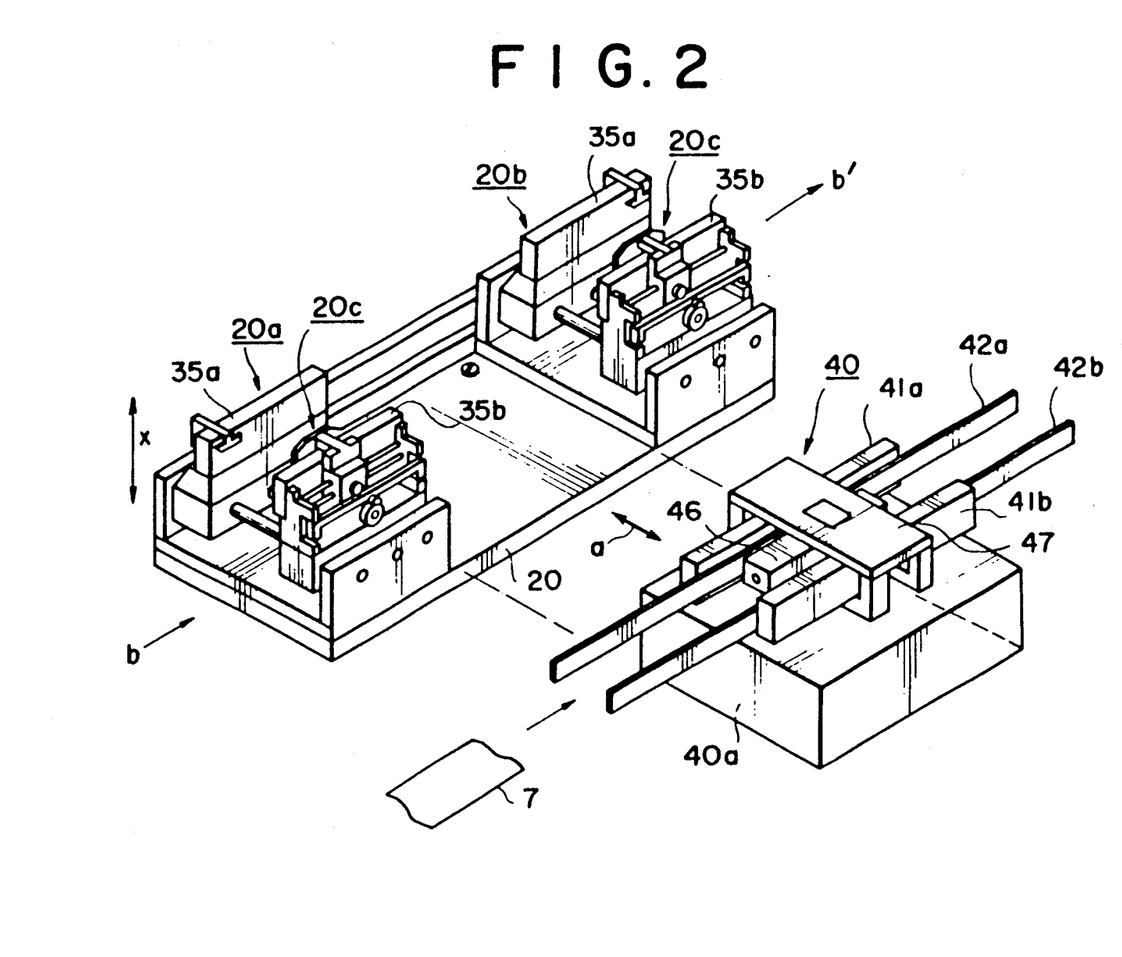
FIG. 2 is a perspective view of a forwarding device according to this invention wherein the heater unit is shown detached for clarity.

Referring first to FIG. 2, let us describe the overall organization of the embodiment according to this invention. The device shown in FIG. 2 comprises a heater unit 40, on which die bonding operations, etc. are performed on the lead frame 7, and a pair of feeder units 20a and 20b for forwarding the lead frame 7. The heater unit 40, shown detached from the feeder units in the figure for clarity can be inserted or removed in the direction a as explained in detail later. In operation, the heater unit 40 is mounted between the feeder units 20a and 20b, and aligned with the forwarding direction b—b' of the lead frame 7.

The lead frame 7, made, for example, of a thin metallic ribbon with a repeating pattern of leads for semiconductor elements, carries a plurality of semiconductor pellets spaced from each other by a predetermined longitudinal pitch. The lead frame 7 is forwarded in the longitudinal direction b—b' by the feeder units 20a and 20 b, so that die bonding operations, etc., are performed on each of the pellets carried on the lead frame 7 at the heater unit 40. The heater unit 40 mounted on the attachment base 40a comprises a pair of side guide rails 41a and 41b for guiding the sides of the lead frame 7, a pair of bottom guide rails 42a and 42b extending the whole longitudinal length of the device for supporting the lower surface of the lead frame 7, a heat block 46 for heating the lead frame 7 positioned thereon for die bonding operations, and a presser plate 47 for pressing the lead frame 7 on the heat block 46 during such operations.

The pair of feeder units 20a and 20b, disposed at the front and the rear side of the heater unit 40, are of identical construction and operate synchronously to forward the lead frame 7 intermittently, each time by a predetermined longitudinal length. In each operation cycle, the feeder units 20c clamp the lead frame 7, lift it by a predetermined height, and forward it by a predetermined longitudinal length, as described in detail below. Each feeder unit 20i a and 20b comprises a pair of side guide rails 35a and 35b for guiding the sides of the lead frame 7, a clamping and lifting mechanism, or a clamp lifter, 20c for clamping and lifting the lead frame 7, and a linear motion guide mechanism. Each clamp lifter 20c is mounted on the linear motion guide mechanism so that it can be translated forward and backward along the longitudinal direction b—b' with respect to the support base 20.

Figure 3:
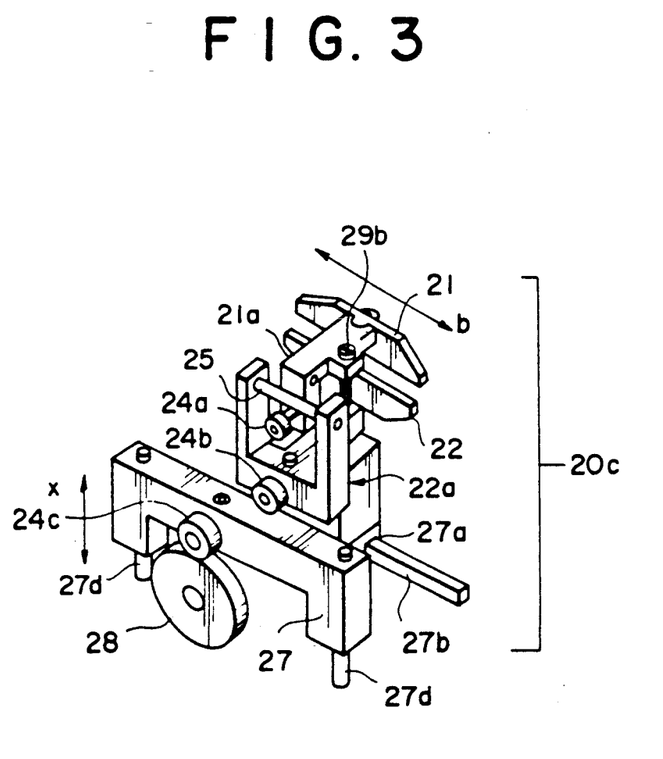
FIGS. 3 and 4 are a perspective view and a schematic end view, respectively, of a clamp lifter of the device of FIG. 2.
Figure 4:
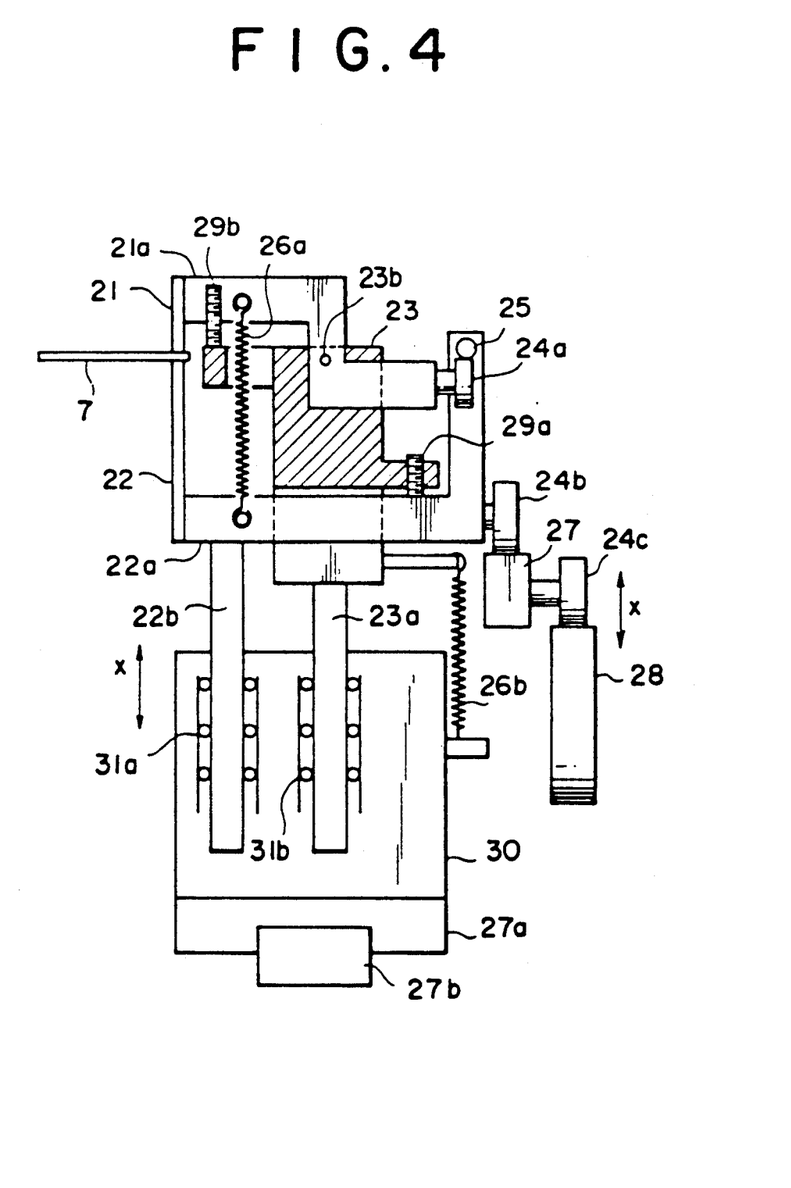

Referring next to FIGS. 3 and 4, let us describe the detailed structure of the clamp lifters 20c of the feeder units 20a and 20i b shown in FIG. 2. Since both clamp lifters 20c have identical structure, a description is given for only one of them.

For the purpose of explanation, the clamp lifter 20c may be divided into two portions: the first portion, including a sliding rail 27 and a cam 28, varying the level of the clamp lifter mechanism; and the second portion, including the upper and lower jaws 21 and 22 for clamping the lead frame 7, jaw holders 21a and 22a, and a support block 23. The second portion is mounted on a linear motion guide mechanism so that it is translated as a whole in the longitudinal direction b (see FIG. 3) with respect to the support base. Let us begin with the description of the organization of the first portion of the clamp lifter.

The inverted U-shaped sliding rail 27 is slidably mounted at its legs 27d to the support base of the device. Thus, the rail 27 is slidable in the vertical direction x with respect to the support base. A roller 24c, rotatably mounted on the outer side surface of the sliding rail 27, rotates on the cam 28 whose radius has three distinct values, as described in detail below. Thus, the level of the upper surface of the sliding rail 27 is varied in accordance with the rotation of the cam 28.

On the other hand, the second portion of the clamp lifter as defined above, which includes all the rest of the clamp lifter assembly, is mounted on a linear motion guide 27a which slides o a guide rail 27b extending in the longitudinal direction b. The linear motion guide 27a is driven, for example, by a ball thread mechanism, for translation forward and backward in the longitudinal direction b with respect to the support base of the whole device. For the purpose of the following description, the second portion itself, which is mounted on the linear motion guide 27a, may be subdivided into two portions: the portion mechanically coupled to the upper jaws 21, and the portion attached to the lower jaw 22. Let us describe the portion fixed to the lower jaw 22.

The lower jaw 22 is fixedly secured to a lower jaw holder 22a. Vertically extending legs 22b of the holder 22a are slidable in the vertical direction x as a whole with respect to the box 30. The holder 22a comprises at the outer side a U-shaped portion, to the side surface of the base portion of which a roller 24b is rotatably mounted which rolls on the upper surface of the sliding rail 27. Thus, the level of the lower jaw 22 and the lower jaw holder 22a is determined by the level of the sliding rail 27, which in turn is determined by the rotational position of the cam 28. Further, a bar 25 extends across and is fixed at its ends to the two legs of the U-shaped portion of the lower jaw holder 22a. This bar 25 rotates the upper jaw holder 21a around the pivot 23a to open the jaws 21 and 22, as explained later.

Next, let us describe the portion of the clamp lifter assembly mechanically coupled to the upper jaw 21: the upper jaw 21, the upper jaw holder 21a, and a support block 23. In the following, reference should be made primarily to FIG. 4, which shows the structural organization more clearly than FIG. 3.

The support block 23 is slidably supported at its legs 23a by bearings 31b that are secured to the bearing box 30 so that the block 23 is slidable in the vertical direction x relative to the box 30. The block 23 is urged by a helical spring 26b, spanned across the block 23 and the box 30, in the downward direction toward the box 30. However, an adjustable stopper 29a mounted on the support block 23 abuts an upper surface of the lower jaw holder 22a to limit the downward movement of the block 23 relative to the lower jaw holder 22a. The stopper 29a is, for example, of the screw-in type so that the height thereof can be adjusted. Thus, the lowest limiting position of the block 23 with respect to the lower jaw holder 22a can be adjusted by adjusting the position of the stopper 29a.

On the other hand, the upper jaw holder 21a, to the inner end surface of which the upper jaw 21 is fixed, is rotatably mounted to the support block 23 by means of a pivot 23b. At the outer end of the holder 21a, a roller 24a is rotatably mounted which bears on the bar 25 fixed to the lower jaw holder 22a. Thus, when the lower jaw holder 22a moves relative to the support block 23 further downward from the position shown in FIG. 4, the accompanying downward movement of the bar 25 forces the roller 24a downward and thus turns the upper jaw holder 21a in the clockwise direction in FIG. 4 with respect to the support block 23, thereby opening the upper and the lower jaw 21 and 22. On the other hand, the upper jaw holder 21a is urged by a helical spring 26a (spanned across an arm of the upper jaw holder 21a and the base portion of the lower jaw holder 22a) in the direction in which the jaws 21 and 22 are closed (in the counterclockwise direction in the figure). The turning of the upper jaw holder 21a on the pivot 23b of the block 23 in the jaw-closing direction (counterclockwise direction in the figure) is limited by an adjustable stopper 29b abutting the support block 23. The stopper 29b may be of the screw-in type, and the height thereof is adjustable. Thus, the turning of the holder 21a in the jaw-closing direction is stopped by the stopper 29b precisely at the position at which the jaws 21 and 22 hold the lead frame 7 securely therebetween. It is noted that the urging force of the spring 26a urging the upper jaw holder 21a in the jaw-closing direction is selected to be weaker than the urging force of the spring 26b that is spanned across the support block 23 and the bearing box 30. The reason for the choice of the relative spring strengths will become apparent from the description below.

The opening and closing of the jaws 21 and 22 and the upward movement of the jaw assembly of FIGS. 3 and 4, for the purpose of clamping and lifting the lead frame 7, are effected as follows.

As noted above, the radius of the cam 28 has three distinct values in accordance with its rotational angle. Thus, in accordance with the rotational position of the cam 28, the upper surface of the sliding rail 27 is raised and lowered in the vertical direction x to three distinct levels: (1) the lowest, (2) the middle, and (3) the highest. Further, the level of the lower jaw holder 22a follows this variation in the level of the sliding rail 27 to the levels (1) through (3), as will become clear from the description below. The relative positions of the parts of the jaw assembly change as follows as the sliding rail 27 is moved through the three levels (1) through (3).

(1) When the sliding rail 27 moves to the lowest level, the lower jaw holder 22a follows the downward movement of the sliding rail 27, the roller 24b of the holder bearing on the upper surface of the sliding rail 27. On the other hand, the support block 23 of the upper jaw assembly is stopped at its lowest limit position relative to the box 30, being urged by the spring 26b downward toward the box 30. Thus, the bar 25, fixed to the lower jaw holder 22a and bearing on the roller 24a of the lower jaw holder 21a rotates the upper jaw holder 21a in the clockwise direction (in FIG. 4) around the pivot 23b against the urging force of the spring 26a. Thus, the jaws 21 and 22 are opened.

(2) When the upper surface of the sliding rail 27 rises to the middle level, the lower jaw holder 22a is raised to the level at which the following relative positions of the parts of the jaw assembly as realized: (a) the lower jaw 22 comes into contact with the lower surface of the lead frame 7; (b) following the upward movement of the bar 25 (which is fixed to the lower jaw holder 22a and bears on the roller 24a mounted at the outer end of the upper jaw holder 21a) relative to the support block 23, the upper jaw holder 21a is, being urged by the spring 26a, rotated in the counterclockwise direction (in FIG. 4) around the pivot 23b, until it is stopped by the stopper 29b at a position at which the upper jaw 21 comes into contact with the upper surface of the lead frame 7 so that the lead frame 7 is clamped between the two jaws 21 and 22; and (c) the end of the stopper 29a secured to the support block 23 comes into contact with the base portion of the lower jaw holder 22a.

(3) During the time when the upper surface of the sliding rail 27 moves from the middle to the top position, the relative positions of the upper and lower jaw holders 21a and 22a and the support block 23 are fixed. Namely, the upward movement of the lower jaw holder 22a following the movement of the sliding rail 27 is transmitted via the stopper 29a to the support block 23. Thus, the block 23 and the upper jaw holder 21a are moved upward against the urging force of the spring 26b, while the lead frame 7 is securely clamped between the two jaws 21 and 22 due to the urging force of the spring 26a. In this connection, it is noted that the amount Δx by which the lead frame 7 is raised corresponds to the difference in the radius of the cam 28 at the two rotational positions corresponding to the middle and the highest level of the sliding rail 27.

Figure 5:
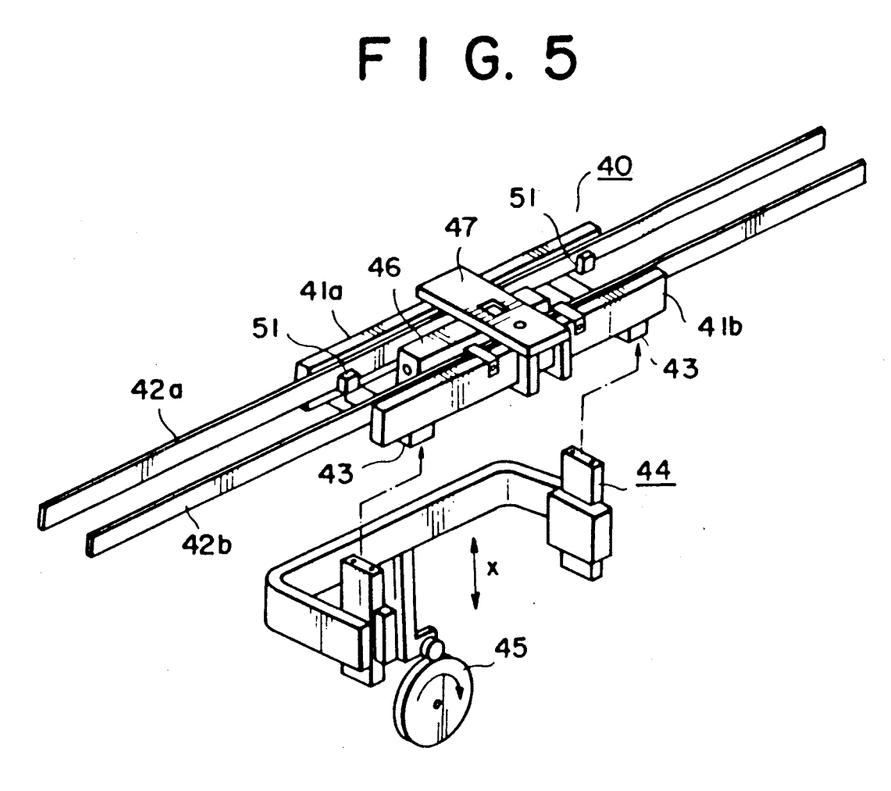
FIG. 5 is an exploded perspective view of the heater unit of the device of FIG. 2.
Figure 6:
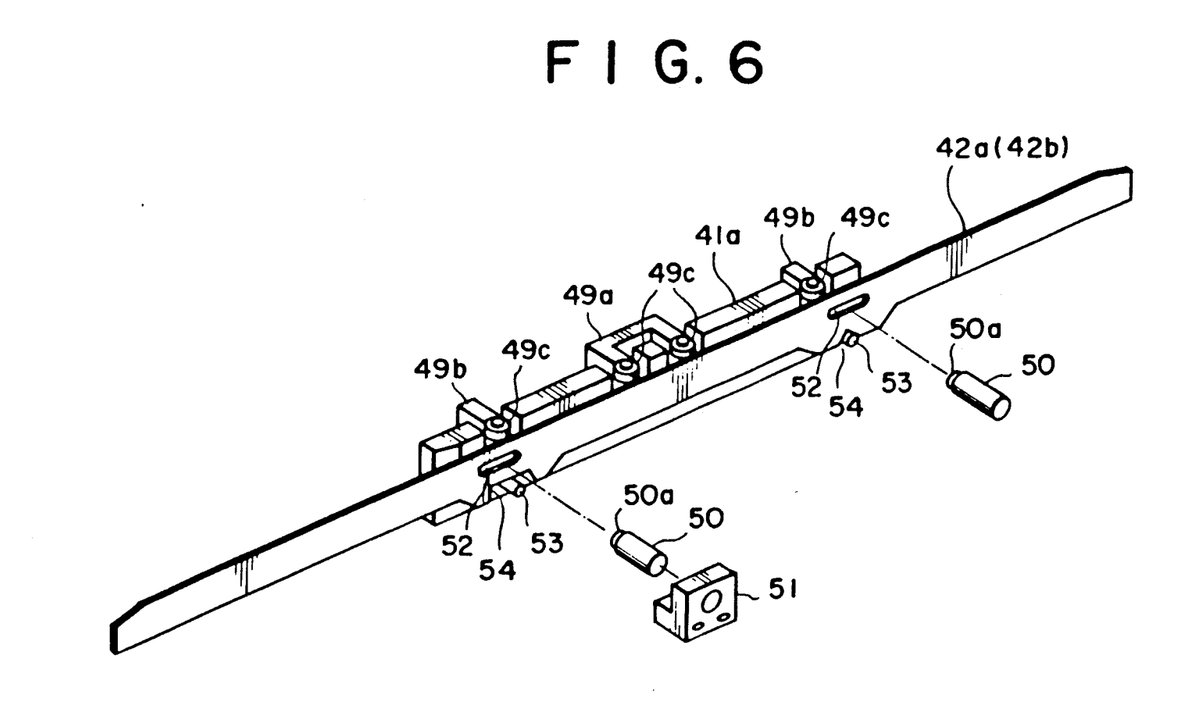
FIG. 6 is a partially exploded perspective view of a half portion of the guide rails of the heater unit of FIG. 5.

Next, referring to FIGS. 5 and 6 of the drawings, let us describe in detail the structure of the heater unit 40 of the forwarding device of FIG. 2.

The side guide rails 41a and 41b, which are aligned with the side guide rails 35a and 35b of the feeder units 20a and 20b (see FIG. 2) when the heater unit 40 is inserted properly therebetween, are fixed to attachment plates 43 so that a fixed mutual positional relationship is maintained therebetween. The attachment plates 43 are mounted to the linear motion guide 44 which is translated upward and downward in the vertical direction x by means of the cam 45. The bottom guide rails 42a and 42b are detachably mounted to the side guide rails 41a and 41b, as described in detail below. Thus, the side guide rails 41a and 41b and the bottom guide rails 42a and 42b can be raised and lowered as a whole, when necessary, by means of the cam 45 and the linear motion guide 44, synchronously with the vertical movement of the clamp lifters 20c.

The heat block 46 for heating the lead frame 7 positioned thereon is fixed to the attachment base 40a (see FIG. 2) of the heater unit 40 so that the level of the upper surface thereof is fixed. The lead frame presser plate 47, for keeping the lead frame in position during die bonding operations, etc., is positioned above the heat block 46 and is translated vertically by means of another cam mechanism (not shown).

The attachment structure of the bottom rails 42a and 42b is best shown in FIG. 6. Let us describe it taking the side of the bottom rail 42a as the example.

As shown in that figure, the side guide rail 41a is provided with lateral position adjusters 49a and 49b, which, by means of the rotatably rollers 49c thereof, press the side of the lead frame 7 toward the other side guide rail 41b, to adjust the lateral position of the lead frame. The attachment of the side guide rail 42a is effected by means of the ball plungers 50 and bottom guide rail holders 51 (only one is shown in the figure) as follows. The bottom guide rail 42a has a pair of elongated holes 52 and a pair of notches 54 that are formed thereunder, respectively, at the bottom side of the rail 42a. When the bottom guide rail 42a is properly positioned, pins 53 mounted on the side guide rail 41a engage the respective notches 54 to support the bottom guide rail 42a from below. The cylindrical ball plungers 50, each provided with a retractable steel ball 50a which is urged outward (toward the bottom guide rail 42a) by a spring, are held by respective holders 51 and are mounted in the side guide rail 41a. Thus, when the bottom guide rail 42a is properly positioned, the elongated holes engage with the balls 50a of the ball plungers 50. By retracting the balls 50a, the bottom guide rail 42a can be easily detached from the side guide rail 41a in the upward direction or upward-sideways. The other bottom guide rail 42b is detachably mounted to the side guide rail 41b in a similar manner.

The insertion of the heater unit 40 between the feeder units 20a and 20b (refer again to FIG. 2) is effected as follows.

First, the bottom guide rails 42a and 42b are detached from the heater unit 40. After the bottom guide rails 42a and 42b are moved upward against the urging forces of the ball plungers 50, and the notches 54 are thus disengaged from the respective pins 53, the rails 42a and 42b are translated sideways and detached from the side guide rails 41a and 41b. Next, the heater unit 40 from which the bottom guide rails 42a and 42b are detached is inserted along the direction a (of FIG. 2) between the feeder units 20a and 20b so that the side guide rails 35a and 35b of the feeder units 20a and 20b are aligned with the side guide rails 41a and 41b of the heater unit 40. Then, the heater unit 40 is fixedly secured to the support base 20. Thereafter, the bottom guide rails 42a and 42b are attached to the side guide rails 41a and 41b by means of a procedure opposite to the attachment procedure thereof described above.

The forwarding operation of the lead frame performed by the whole device can now be easily comprehended. Let us now describe it referring in particular to FIG. 7 in which it should be noted that the level x1 of the upper surface the heat block 46 is fixed while the levels of other parts may vary.

First, the lead frame 7 is inserted by a predetermined longitudinal length into the front feeder unit 20a (refer to FIG. 2) by another forwarding means (not shown), just as in the conventional case. When the lead frame 7 is thus inserted, both lateral sides thereof are guided by the side guide rails 35a and 35b. In addition, the bottom surface thereof is supported by the bottom guide rails 42a and 42b. Thus, the lead frame 7 is precisely positioned when it is inserted into the feeder unit 20a.

Next, the clamp lifters 20c, whose jaws 21 and 22 are opened, are translated, in the direction opposite to the forwarding direction of the lead frame 7, by means of the linear motion guide 27a, to a position at which the upper and lower jaws 21 and 22 of the clamp lifter 20c of the front feeder unit 20a are positioned above and below the lead frame 7, respectively, at a longitudinal position that is situated upstream of the front end of the lead frame 7 by a predetermined length. During this translation of the clamp lifters 20c in the reverse direction, the roller 24b turns on the upper surface of the sliding rail 27 (see FIG. 3 in particular). Further, the cam 28 is in contact with the roller 24c at its shortest radius so that the sliding rail 27 is at its lowest level. As a result, the jaws 21 and 22 are kept open above and below the lead frame 7 during the reverse translation of the clamp lifters 20c.

Figure 7A:
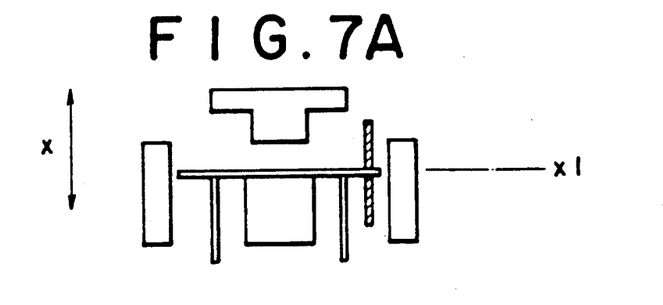
FIGS. 7A through 7D are schematic end views showing the levels of the various parts of the device of FIG. 2 during the forwarding operation cycle of a lead frame.

Next, the cam 28 of the clamp lifters 20c is operated to close the jaws 21 and 22 and to clamp the lead frame 7 therebetween, as shown in FIG. 7A. The cam 28 is rotated to a rotational position at which it bears on the roller 24c at the radius of intermediate length. Thus, the sliding rail 27 is raised to the middle level via the roller 24c. This raises the lower jaw holder 22a and rotates the upper jaw holder 21a around the pivot 23b, as described in detail above by reference to FIG. 4. Thus, the lead frame 7 is securely clamped between the upper and lower jaws 21 and 22 of the clamp lifter 20c.

Figure 7B:
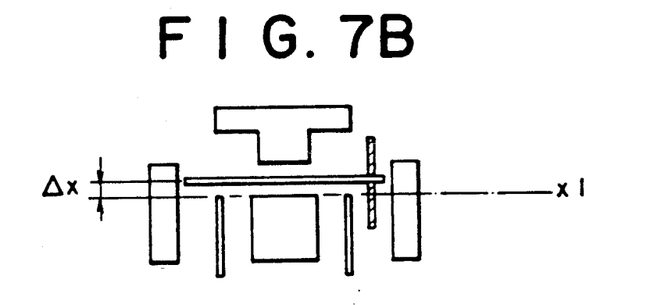

Then, the cam 28 is further turned and the sliding rail 27 is raised from the middle to the highest level so that the jaws 21 and 22, which are kept in the closed state and clamp the lead frame 7 therebetween, are raised by a predetermined amount $\Delta x$, as shown in FIG. 7B. Thus, the lead frame 7 is lifted by the predetermined amount $\Delta x$ with respect to the level x1 of the upper surface of the heat block 46. The operation of the clamp lifters during this lifting procedure has also been described above in detail with reference to FIG. 14.

Thereafter, the clamp lifters 20c are translated by a predetermined length in the forward direction by means of the linear motion guide 27a. Thus, the lead frame 7, which is clamped and lifted by the clamp lifter 20c, is forwarded by the predetermined longitudinal length. When the lead frame 7 is forwarded by the predetermined length, the cam 28 is again rotated to bring the sliding rail 27 to the middle level so that the lead frame 7 is lowered to the level x1 of the upper surface of the heat block 46. Then, the cam 28 is further rotated to bring the sliding rail 27 to the lowest level so that the jaws 21 and 22 are opened and the lead frame 7 is placed on the bottom guide rails 42a and 42b. This ends a forward lying step.

Subsequently, the linear motion guide 27a is operated and the clamp lifters 20c are returned to their original positions at which the clamping step as described above has been effected. This is the return step of the clamp lifters.

The above steps—clamping, lifting, forwarding, and returning steps13 complete one cycle of the forwarding operation. It is noted that the forwarding length of the lead frame 7 effected in one forwardly cycle may be selected to be equal to the pitch of the lead frame 7 (the longitudinal separation between semiconductor pellets carried on the lead frame 7). By repeating the above forwarding cycles, the lead frame 7 is forwarded intermittently each time by a predetermined length into the heater unit 40 so that die bonding operations, etc., may be performed thereon after each forwarding step.

Figure 7C:
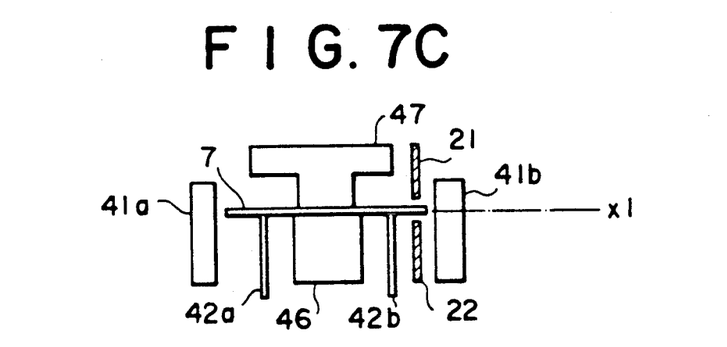

Die bonding operations, etc., are performed on the portion of the lead frame 7 positioned on the heat block 46 as shown in FIG. 7C. The lead frame 7 which is forwarded to the heater unit 40 is pressed by the adjusters 49a and 49b provided on the side guide rail 41a toward the other side guide rail 41b, and thus is adjusted in its lateral position. After this, the presser plate 47 is lowered to press down and keep in position the lead frame 7 on the heat block 46. Then, die bonding operations, etc., are performed on the portion of the lead frame 7 situated on the heat block 46. An operation step is thus completed.

After the die bonding operations, etc., are completed, the clamping and lifting steps and the steps subsequent thereto as described above are resumed by the clamp lifters 20c, which, in the meantime, is returned to the original positions in the return step.

Figure 7D:
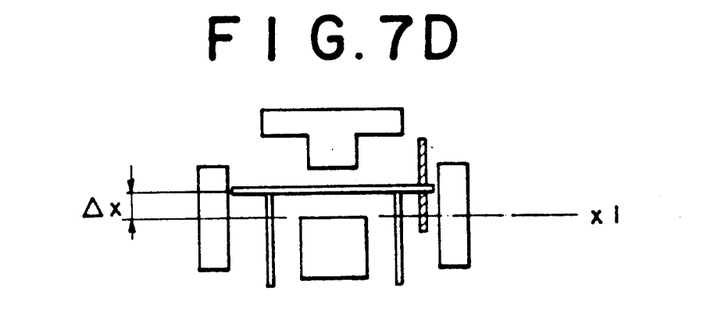

In the above forwarding operation, the bottom guide rails 42a and 42b and the side guide rails 41a and 41b of the heater unit 40 have been fixed. However, they may be raised and lowered synchronously with the lifting and lowering of the lead frame 7 by the clamp lifters 20c. The lead frame 7 is clamped and supported by the jaws 21 and 22 at one side only, and thus is in a cantilever support. Hence, when the width of the lead frame 7 is great, the side thereof which is not clamped by the jaws 21 and 22 may be bent downward to touch on the heat block 46 and the bottom guide rail 42a at the unclamped side. In such case, the side guide rails 41a and 41b and the bottom guide rails 41a and 42b should be raised (by driving the cam 45 and operating the linear motion guide 44 in the heater unit 40), as shown in FIG. 7D, in synchronization with the lifting of the lead frame 7 by the clamp lifters 20c (which is effected by means of the rotation of the cam 28 from the middle to the highest level) by an amount equal to the lifting height $\Delta x$ of the lead frame 7. Then, since the height $\Delta x$ of the lifting of the lead frame 7 and the rise height of the bottom guide rails 42a and 42b are equal to each other, even lead frames 7 of greater widths can be lifted and forwarded in a horizontal attitude and are not subjected to friction (with portions other than the bottom guide rails 42a and 42b) during the forwarding step.

The above description has been made of a particular embodiment. It will be understood, however, that the modifications may be made without departing from the spirit of this invention. For example, in the above embodiment, a of feeder units are provided in tandem along the forwarding path of the lead frame so that the lifting and clamping operation of the lead frame may be effected by either of them. However, when the lead frame 7 can be clamped only at the front or the rear end thereof, one feeder unit suffices. It should be noted, however, that if only one feeder unit is provided, there remain portions at the front or rear end of the lead frame 7 on which the die bonding operations, etc., cannot be performed. Thus, the yield is somewhat decreased. Further, so long as the operative relationship between the upper jaw holder 21a and lower jaw holder 22a is maintained as in the above embodiment, the bearing relationship between the leverage bar 25 and the roller 24a, the kind of the spring 26a and the spanning position thereof, etc., may be modified in any desired way.

Incidentally, it is noted that the upper jaw 21 of the clamp lifters 20c is mounted to the upper jaw holder 21a via an elongated hole formed in the upper jaw. Thus, the position of the upper jaw 21 may be adjusted so that the lower end surface of the upper jaw 21 is horizontal at the clamping position.

The appended claims are contemplated to cover any such modifications as fall within the true spirit and scope of this invention.

What is claimed is:

1. A device for forwarding ribbon-shaped lead frames carrying a plurality of semiconductor pellets thereon comprising:
   clamp lifter means, disposed along a forwarding path for the lead frames, for clamping a lead frame and lifting the clamped, lead frame a predetermined height; and
   translator means for translating said clamp lifter means forward and backward along the forwarding path of the lead frame.

2. A device for forwarding lead frames as claimed in claim 1 comprising:
   heater means for heating a portion of the lead frame forwarded thereto, said heater means being disposed along the forwarding path of the lead frames near said clamp lifter and translator means, said heater means including a fixed position heater surface and
   bottom guide rail means, extending along the forwarding path of the lead frames over a length spanning longitudinal positions of the clamp lifter and the heater means, for supporting a bottom surface of the forwarded lead frame;
   wherein said clamp lifter means clamps the lead frame supported on the bottom guide rail means, lifts the lead frame above the fixed level of the heater surface of the heater means by the predetermined height, and, after the clamp lifer means is translated forward by said translator means to that the clamped lead frame is forwarded by a predetermined length, lowers the lead frame to the level of the heater surface of the heater means.

3. A device for forwarding lead frames as claimed in claim 1 wherein said translator means is a linear motion guide mechanism.

4. A device for forwarding lead frames as claimed in claim 2 comprising side guide rail means for adjusting a lateral position of the forwarded lead frame.

5. A device for forwarding lead frames as claimed in claim 2 wherein said bottom guide rail means is detachable.

6. A device for forwarding lead frames as claimed in claim 2 comprising means for vertically translating the bottom guide rail means synchronously with the lifting and lowering of the lead frame by the clamp lifter means.

7. A device for forwarding lead frames as claimed in claim 1 wherein said clamp lifter means comprises:
   opposing upper and lower jaws between which the lead frame is clamped;
   a lower jaw holder supporting the lower jaw and vertically slidably supported by said translator means;
   cam mechanism means for varying the vertical position of the lower jaw holder to three distinct levels, a lower, a middle, and a highest level;
   a support block vertically slidably supported by said translator means;
   an upper jaw holder supporting the upper jaw and rotatably supported by said support block for rotation between a jaw-closing direction and a jaw-opening direction;
   leverage means fixed to said jaws holder for rotating said upper jaw holder in the jaw-opening direction to open the upper and lower jaws when the lower jaw holder is brought from the middle to the lowest level by means of the cam mechanism means;
   urging means for urging said upper jaw holder toward the jaw-closing direction, wherein the urging means urges and rotates the upper jaw holder toward the jaw-closing direction to clamp the lead frame between the two jaws when the lower jaw holder is raised from the lowest to the middle level by means of the cam mechanism means; and
   engager means for engaging said support block and said lower jaw holder when the lower jaw holder is between the middle and the highest levels as the lower jaw holder is raised by said cam mechanism from the middle to the highest level, the upper jaw holder is vertically translated upward together with the lower jaw holder, with the upper and lower jaws closed, thereby lifting the lead frame clamped between the two jaws the predetermined height.

8. A device for forwarding lead frames as claimed in claim 7, wherein said engager means comprises an adjustable stopper which is mounted on the support block and abuts the lower jaw holder when the lower jaw holder is between the middle and the highest levels.

9. A device for forwarding lead frames as claimed in claim 7 wherein said cam mechanism means comprises:
   a cam having three distinct length radii;
   a support base;
   a sliding rail vertically slidably mounted to the support base, said sliding rail having a roller rotatably mounted thereto which bears on said cam so that the level of an upper surface of the sliding rail varies in accordance with the rotational angle of the cam to three distinct levels: a lowest, a middle, and a highest level; and
   a roller rotatably mounted to said lower jaw holder and rotating on the upper surface of said sliding rail so that the vertical level of the lower jaw holder varies in accordance with the rotational angle of the cam to said three distinct levels: the lowest, the middle, and the highest level.

10. A device for forwarding lead frames as claimed in claim 7 comprising second urging means, spanning and connected to said support block and said translator means, for urging said support block, relative to said translator means, to the lowest vertical level.

11. A device for forwarding lead frames as claimed in claim 7 comprising adjustable stopper means fixed to said upper jaw holder and abutting the support block, for adjustably stopping rotation of said upper jaw holder in the jaw-closing direction and at which the lead frame to be forwarded is securely clamped between the upper and lower jaws.

12. A device for forwarding lead frames as claimed in claim 7 wherein said leverage means comprises a horizontally extending bar fixed to the lower jaw holder, the upper jaw holder having a roller rotatably mounted thereon and bearing on said bar from below.

13. A method of forwarding lead frames comprising:
 (a) clamping a lead frame supported on a bottom guide rail means and lifting the lead frame a predetermined height with a clamp lifter means above the level of a heater surface of a heater means;
 (b) translating the clamp lifter means in the lead frame forwarding direction by a predetermined length;
 (c) lowering the clamped lead frame to the heater surface and releasing the clamp;
 (d) returning the released clamp lifter means to the clamp position of step (a) before lifting: and
 (e) performing an assembly process on a semiconductor pellet carried on a portion of the lead frame positioned above the heater surface.

14. A method as claimed in claim 13 wherein step (e) comprises die bonding.

* * * * *

UNITED STATES PATENT AND TRADEMARK OFFICE
CERTIFICATE OF CORRECTION

PATENT NO. : 5,082,165

DATED : JANUARY 21, 1992

INVENTOR(S) : MASAHIRO ISHIZUKA

It is certified that error appears in the above-identified patent and that said Letters Patent is hereby corrected as shown below:

Claim 1, Column 11, line 30, delete ",".

Claim 2, Column 11, line 42, after "face" insert --;--;.

Claim 2, Column 11, line 53, change "to" to --so--.

Claim 7, Column 12, line 19, change "jaws" to --jaw holder--.

Claim 8, Column 12, line 43, delete ",".

Claim 13, Column 14, line 9, change ":" to --;--.

Signed and Sealed this

Thirteenth Day of April, 1993

Attest:

STEPHEN G. KUNIN

*Attesting Officer*      *Acting Commissioner of Patents and Trademarks*